Nov. 2, 1926.
C. L. V. DOZER
1,605,817
FRUIT GATHERER'S COAT
Filed April 2, 1926
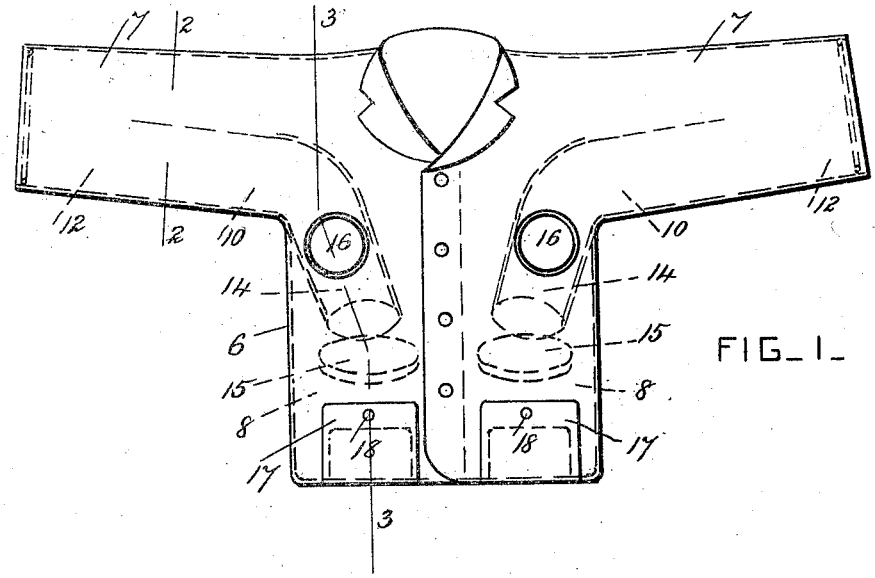
FIG_1_
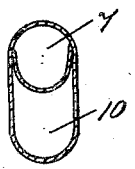
FIG_2_
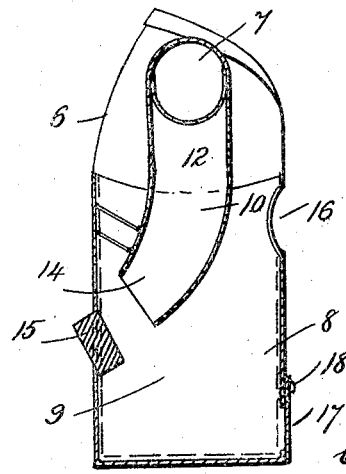
FIG_3_
Inventor
Clement L. V. Dozer
by Hubert W. Turner
Attorney.

Patented Nov. 2, 1926.

1,605,817

UNITED STATES PATENT OFFICE.

CLEMENT L. V. DOZER, OF PROSPECT, PENNSYLVANIA.

FRUIT-GATHERER'S COAT.

Application filed April 2, 1926. Serial No. 99,273.

This invention relates to coats adapted to be worn by persons gathering fruit or other similar things; and it consists in providing the coat with pockets for the fruit and chutes formed with or attached to the sleeves and leading into the pockets as hereinafter fully described and claimed.

In the drawings, Figure 1 is a front view of a coat with the arms extended and provided with pockets and chutes according to this invention. Fig. 2 is a cross-section through a sleeve and chute, taken on the line 2—2 in Fig. 1. Fig. 3 is a vertical section of a portion of one sleeve and chute showing the buffer pad inside the pocket, and taken on the line 3—3 in Fig. 1.

The coat 6 is made of any suitable material such as ducking, and is of any approved size and shape, and is provided with sleeves 7 in the usual way. Under each sleeve a large pocket 8 is formed in or on the coat, and preferably between its outside material and the lining 9, so that the coat lining forms a portion of the pocket. These pockets are of any convenient size and shape. A chute 10 large enough for the fruit to roll through is attached to the upper part of each pocket, and is formed of textile material similar to the coat. This chute extends along the sleeve, and may be the lower side of a very wide sleeve, or it may be formed separate from the sleeve and secured to the sleeve in any way with its entrance 12 conveniently arranged adjacent to the hand which projects from the sleeve. The chute 10 has an extension 14 which projects within the pocket, and a buffer pad 15 of soft material is secured to the back of the pocket in line with the extension, which projects rearwardly. This buffer is inclined downwardly and inwardly so that the fruit will be checked when it strikes it, and will roll off it into the bottom part of the storage pocket.

Each pocket is provided with an opening 16 at its upper part so that fruit can be placed in it without passing down the chute. Each pocket also has a flap 17 at its lower part provided with buttons 18 or other fastenings, and adapted to discharge the fruit when opened.

The picker can use both hands in picking the fruit, and whenever he picks a fruit he drops it into one of the chutes by a deft turn of the hand, so that it slides down the chute into the pocket connected to it. The buffer pad breaks the fall of the fruit and prevents it from being bruised.

The pockets are made to hold any desired quantity of fruit, and to distribute the weight of it suitably with respect to the body of the wearer. The entrance 10 of the chute may be stiffened in any way so as to hold it open and ready to receive the fruit.

What I claim is:

In a device for use while picking fruit, the combination, of a receptacle for the fruit, a conveyer sleeve adapted to be secured to a person's arm and having an inlet opening for the fruit adjacent to the person's hand, said sleeve being attached to the upper part of the receptacle and provided with a laterally inclined tubular extension within the receptacle, and a buffer pad of soft material secured against a side of the receptacle above the bottom thereof, said buffer pad operating to check the momentum of the fruit and prevent it from being bruised.

In testimony whereof I have affixed my signature.

CLEMENT L. V. DOZER.